(12) United States Patent
Cigni et al.

(10) Patent No.: US 9,694,431 B2
(45) Date of Patent: Jul. 4, 2017

(54) MILLING CUTTER AND METHOD OF USE

(71) Applicant: Nuovo Pignone Srl, Florence (IT)

(72) Inventors: Emanuele Cigni, Florence (IT); Massimo Guerrini, Florence (IT)

(73) Assignee: Nuovo Pignone SrL, Florence (IT)

( * ) Notice: Subject to any disclaimer, the term of this patent is extended or adjusted under 35 U.S.C. 154(b) by 168 days.

(21) Appl. No.: 14/429,816

(22) PCT Filed: Sep. 19, 2013

(86) PCT No.: PCT/EP2013/069484
§ 371 (c)(1),
(2) Date: Mar. 20, 2015

(87) PCT Pub. No.: WO2014/044760
PCT Pub. Date: Mar. 27, 2014

(65) Prior Publication Data
US 2015/0266111 A1    Sep. 24, 2015

(30) Foreign Application Priority Data
Sep. 20, 2012    (IT) ............ CO2012A0044

(51) Int. Cl.
*B23C 5/14*    (2006.01)
*B23C 3/18*    (2006.01)
*B23C 5/10*    (2006.01)

(52) U.S. Cl.
CPC ........... *B23C 5/14* (2013.01); *B23C 3/18* (2013.01); *B23C 5/10* (2013.01);
(Continued)

(58) Field of Classification Search
CPC . B23C 5/10; B23C 2210/407; B23C 2210/08; B23C 2210/084; B23C 2210/088
See application file for complete search history.

(56) References Cited

U.S. PATENT DOCUMENTS 3,058,199 A    10/1962   Cave et al.
4,131,116 A *  12/1978   Hedrick ............. A61B 17/1666
                                                   408/207
(Continued)

FOREIGN PATENT DOCUMENTS

CN    2858150 Y    1/2007
CN    201164914 Y   12/2008
(Continued)

OTHER PUBLICATIONS

Unofficial English translation of Chinese Office Action issued in connection with corresponding CN Application No. 201380049236.8 on May 3, 2016.
(Continued)

*Primary Examiner* — Will Fridie, Jr.
(74) *Attorney, Agent, or Firm* — GE Global Patent Operation

(57) ABSTRACT

A cutting head for a mill configured to rotate about an axis to remove material from a work piece includes a base surface, a side region connected to the base surface, and a top region connected to the side region. The top region defines a central area and a periphery. A plurality of top teeth are disposed on the top region. The top teeth have cutting edges configured to contact the work piece to remove material. Each cutting edge extends from the central area towards the periphery and includes an axially extending peak portion.

20 Claims, 5 Drawing Sheets

(52) U.S. Cl.
CPC .... *B23C 2210/282* (2013.01); *B23C 2210/54* (2013.01); *B23C 2220/56* (2013.01); *Y10T 407/1964* (2015.01); *Y10T 409/303752* (2015.01)

(56) References Cited

U.S. PATENT DOCUMENTS

| | | | | |
|---|---|---|---|---|
| 5,376,092 | A * | 12/1994 | Hein | A61B 17/1666 407/54 |
| 7,753,624 | B2 * | 7/2010 | Gunther | B23C 5/10 407/30 |
| 8,807,882 | B2 * | 8/2014 | Volokh | B23C 5/10 407/53 |
| 2004/0084221 | A1 * | 5/2004 | Luth | E03F 9/005 175/327 |
| 2004/0223817 | A1 * | 11/2004 | Berglow | B23C 5/10 407/34 |
| 2005/0025584 | A1 * | 2/2005 | Kolker | B23C 5/10 407/54 |
| 2005/0123363 | A1 | 6/2005 | Ahrnkiel et al. | |
| 2007/0104551 | A1 * | 5/2007 | Gaiser | B23B 31/107 409/132 |
| 2008/0206000 | A1 | 8/2008 | Sasu et al. | |
| 2009/0060663 | A1 | 3/2009 | Rouge et al. | |
| 2009/0208902 | A1 * | 8/2009 | Danger | A61C 3/02 433/165 |
| 2009/0252564 | A1 | 10/2009 | Volokh et al. | |
| 2010/0175256 | A1 | 7/2010 | Zhu et al. | |
| 2013/0051940 | A1 * | 2/2013 | Hobohm | B23C 5/10 407/53 |
| 2014/0205390 | A1 * | 7/2014 | Baba | B23C 5/10 407/54 |
| 2015/0336185 | A1 * | 11/2015 | Huth | B23C 5/10 407/54 |

FOREIGN PATENT DOCUMENTS

| | | |
|---|---|---|
| CN | 101376180 A | 3/2009 |
| CN | 100479958 C | 4/2009 |
| DE | 3308478 A1 | 9/1983 |
| DE | 10318948 A1 | 8/2004 |
| EP | 2206577 A1 | 7/2010 |
| JP | 2002292515 A | 10/2002 |
| JP | 2003291024 A | 10/2003 |
| WO | 2005089991 A1 | 9/2005 |
| WO | 2011076666 A1 | 6/2011 |

OTHER PUBLICATIONS

Italian Search Report dated Jun. 17, 2013 which was issued in connection with Italian Patent Application No. CO2012A000044 which was filed on Sep. 20, 2012.

International Search Report and Written Opinion dated Nov. 29, 2013 which was issued in connection with PCT Patent Application No. PCT/EP13/069484 which was filed on Sep. 19, 2013.

* cited by examiner

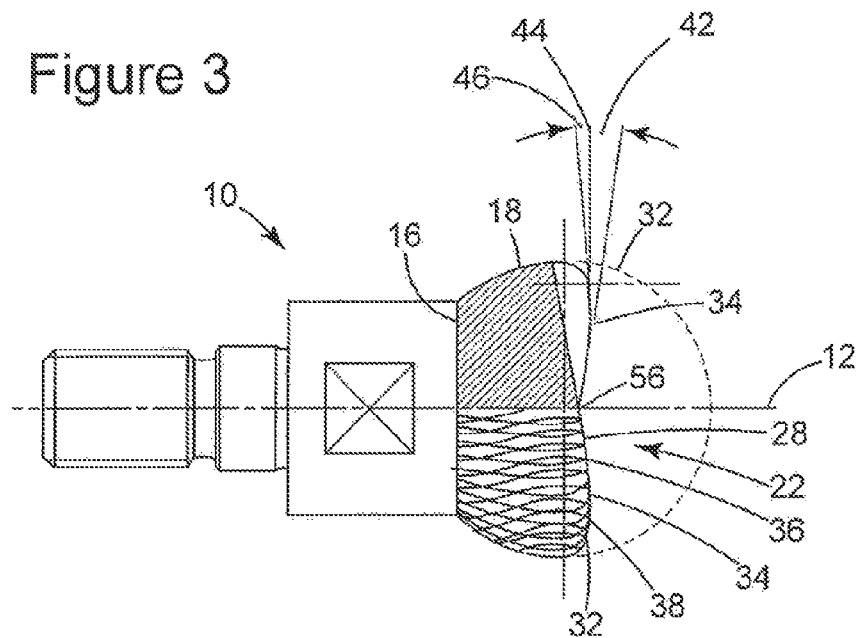
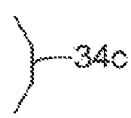
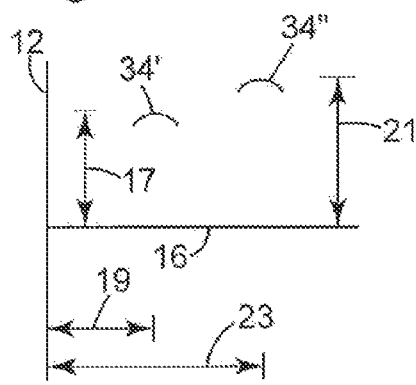
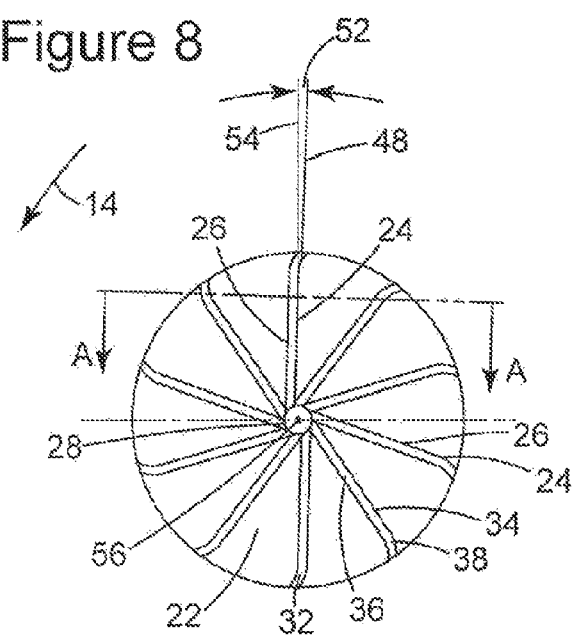

MILLING CUTTER AND METHOD OF USE

BACKGROUND

Embodiments of the subject matter disclosed herein generally relate to a mill, and more specifically to a cutting head for a mill used to perform a Z-axis plunging operation, and a method of using the mill to perform a plunge milling operation.

In the oil and gas industry, compressors are often used to pressurize oil or gas flowing through a pipeline. Some compressors incorporate an impeller blade having a relatively complex geometry which may provide a desired flow characteristic to the fluid in the compressor. In the manufacture of such blades, a milling machine can be used to create the desired geometry by translating a cutting head along an X-axis and a Y-axis while plunging the cutting head along the Z-axis. This is referred to as a Z-axis plunging operation or plunge milling.

FIG. 1A is a side view of a known high-speed steel (HSS) mill 100, and FIG. 1B is a frontal view of the known mill 100. The known mill 100 includes top cutting teeth 151 on a top surface of a cutting head 150, which is connected to a motor driven shaft extending along the Z-axis. Rotation of the cutting head 150 around the Z-axis results in the removal of material from a work piece, such as an impeller blade, by the top cutting teeth 151. FIG. 2 shows a known insert mill 102 having teeth 171 that are attached with screws to a shaft 173.

Using mills 100 and 102 to manufacture an impeller blade can provide some advantages compared to manufacturing the blade by other methods. For example, mills 100 and 102 can be used to manufacture geometries that would be difficult or impossible to manufacture by other methods. Further, the known mills 100 and 102 can remove a relative large volume of material in a relatively short period of time.

However, some disadvantages have developed with known mills. For example, whereas conventional impeller blades are often made of aluminum, today's impeller blade designers are increasingly calling for the incorporation of other materials, such as super alloys. Characteristics of these materials, such as hardness, ductility, malleability, etc., may be different from the characteristics of aluminum. Such differences may render known mills less effective. Moreover, increased demand for impeller blades has fueled a corresponding demand for even greater production speeds. Accordingly, what is needed is a mill which may provide more versatility in the spectrum of materials which may be milled therewith and which may also provide increased wear resistance and run times.

SUMMARY

According to an exemplary embodiment, a cutting head for a mill configured to rotate about an axis to remove material from a work piece includes a base surface, a side region connected to the base surface, and a top region connected to the side region. The top region defines a central area and a periphery. A plurality of top teeth are disposed on the top region. The top teeth have cutting edges configured to contact the work piece to remove material. Each cutting edge extends from the central area towards the periphery and includes an axially extending peak portion.

According to another exemplary embodiment, a method of milling a work piece can include the steps of rotating a cutting head about an axis and removing material from the work piece with cutting edges of top teeth on the cutting head, each cutting edge extending from a central area of the top region towards a periphery thereof and including an axially extending peak portion disposed between the central area and the periphery.

According to another exemplary embodiment, a method of milling a work piece can include the steps of rotating a cutting head about an axis and removing material from the work piece with cutting edges of top teeth of the cutting head. Each cutting edge extends from a central area of the top region towards a periphery thereof and defines a spoke axis which forms a non-zero angle relative to a reference radial line extending from the center of the top region. Each spoke axis intersects each respective reference radial line at the periphery of the cutting head.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 3 is a partial cross-sectional, elevation view of a cutting head according to an exemplary embodiment;

FIGS. 4, 5, and 6 each show peak portions of cutting edges according to alternative embodiments;

FIG. 7 is a schematic view of a top region of a cutting head including peak portions at various distances from a center of the top region and a base surface thereof according to an alternative embodiment;

FIG. 8 is a view of a top view of the cutting head shown in FIG. 3;

DETAILED DESCRIPTION

Figure 1A:
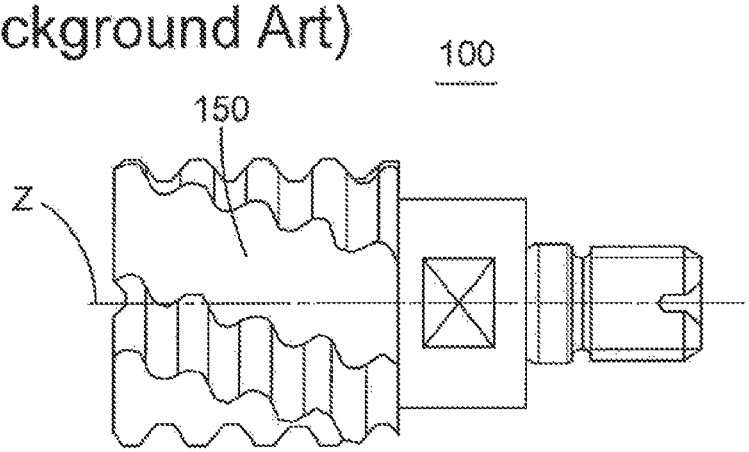
FIGS. 1A and 1B are side and front views of a high speed steel mill.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a cutting head for a Z-plunging mill. However, the embodiments to be discussed next are not limited to this mill, but may be applied to other mills.

An exemplary embodiment of a cutting head for a mill according to the present invention is shown in FIG. 3. Therein, a cutting head 10 includes a base surface 16, a substantially hemispherical side region 18 extending from the base surface 16, and a top region 22 atop the side region 18.

As shown in FIGS. 3 and 8, top region 22 includes generally a central area 28 and a periphery 32. A plurality of top teeth 24 disposed on top region 22 extend from central area 28 to periphery 32. Each of the plurality of top teeth 24 includes a cutting edge 26 having an axially extending peak portion 34. In the exemplary embodiment shown in FIGS. 3 and 8, each peak portion 34 may be the farthest extending portion of the cutting edge 26 from the base surface 16.

As shown in the detailed view of FIG. 4, each peak portion 34 may be provided with a rounded profile. However, peak portions 34 may be provided with other profiles. For example, in an alternative embodiment shown in FIG. 5, a peak portion 34*b* is provided with a pointed profile. As another example, in the alternative embodiment shown in FIG. 6, a peak portion 34*c* is provided with a flat profile.

Figure 1B:
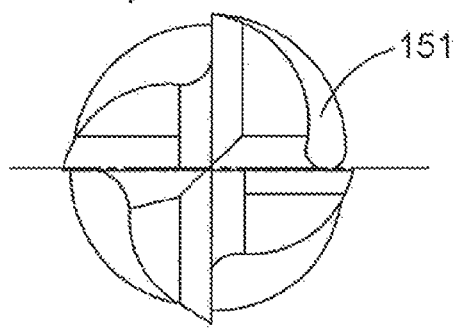
Figure 2:
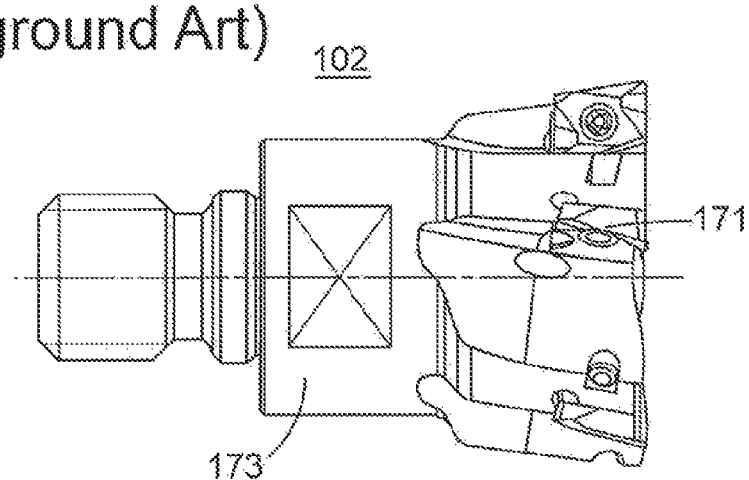
FIG. 2 is a side view of an insert mill.

As may be appreciated from FIGS. 3 to 6, since the peak portions 34 of cutting head 10 extend axially away from top region 22, the cutting edges 26 may be allowed to gradually engage a work piece (not shown) during a Z-axis plunge cutting operation. Specifically, peak portions 34 may provide initial contact with a work piece when cutting head 10 is advanced along axis 12 followed by portions of the cutting edges extending towards the central area 28 and periphery 32. This feature may provide an enhanced material removal process when compared to, for example, a cutting head which presents cutting surfaces which lie in a common plane during plunge milling along the Z-axis such as mill 100 shown in FIGS. 1A and 1B.

As may be further appreciated from FIG. 3, each peak portion 34 is located proximally of the periphery 32. Thus, the speed of each top tooth 24 at peak portion 34 is greater than the speed of each top tooth 24 proximal to central area 28. The relatively higher speed of peak portions 34 may also provide enhanced operation to cutting head 10 during plunge milling.

As further shown in FIG. 3, the cutting edge 26 of each top tooth 24 includes a first portion 36 and a second portion 38. First portion 36 extends between central area 28 and peak portion 34. Second portion 38 extends between peak portion 34 and periphery 32. In the embodiment of FIGS. 3 and 8, each first portion 36 is disposed at a first angle 42 relative to a reference plane 44 perpendicular to axis 12 and each second portion 38 is disposed at a second angle 46 relative to the reference plane 44. As shown in FIG. 3, first angle 42 is greater than second angle 46.

As further shown in FIG. 3, first portion 36 and second portion 38 of each cutting edge 26 intersect with a respective peak portion 34 such that each peak portion 34 is disposed at a greater distance from the base surface 16 than first portion 36 and second portion 38. Also, in one exemplary embodiment, the cutting edges 26 of cutting head 10 are provided with a common first angle 42 and a common second angle 46 which allows the peak portions 34 to define a circle. Moreover, in one exemplary embodiment, the intersection of each cutting edge 26 with central area 28 and the intersection of each cutting edge 26 with periphery 32 lie in a common plane. These attributes of cutting head 10 allow the peak portions 34 of cutting head 10 to make contact with a work piece simultaneously and along a common circle during Z-axis plunge milling.

In alternative embodiments, first angle 42 or second angle 46 may be varied across top teeth 24 in order to provide peak portions 34 which vary in distance from base surface 16. For example, and as shown schematically in FIG. 7, some of the peak portions 34' may be configured at a first distance 17 from base surface 16 and at a first distance 19 from center 56 and some of the peak portions 34" may be configured at a second distance 21 from base surface 16 and at a second distance 23 from center 56.

Turning to FIG. 8, each top tooth 24 may define a spoke axis 48 disposed at an angle 52 relative to a reference radial line 54 extending from the center 56 of top region 22. As further shown in FIG. 8, each spoke axis 48 may intersect the respective reference radial line 54 at periphery 32. In the embodiment of FIGS. 3 and 8, angle 52 is configured such that the second portion 38 of each cutting edge 26 lags the first portion 36 of each cutting edge 26 in the direction of rotation 14 of the cutting head 10.

Figure 9:
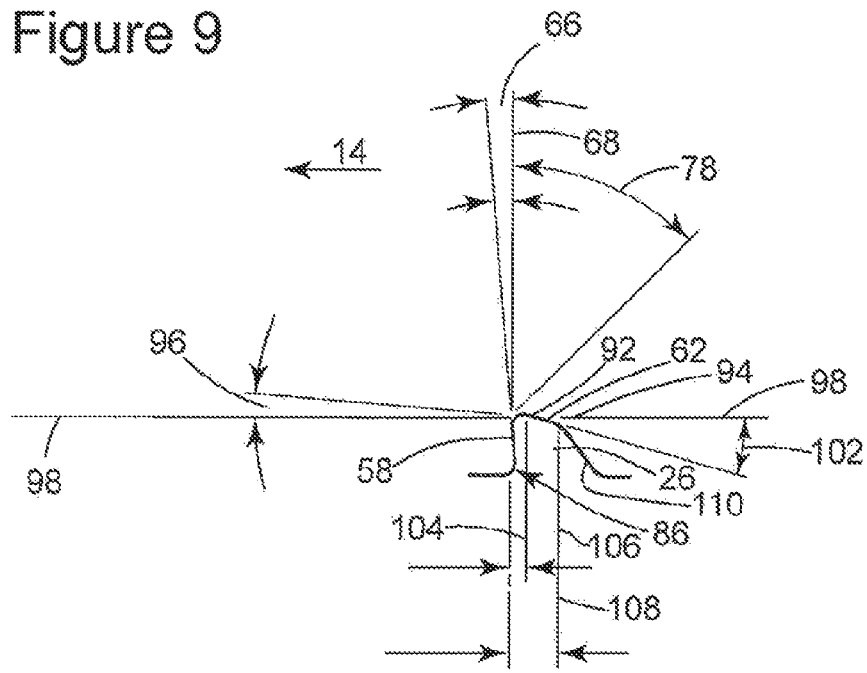
FIGS. 9, 10, and 11 are detail views of the cutting head shown in FIG. 3, taken along line A-A of FIG. 3.
Figure 10:
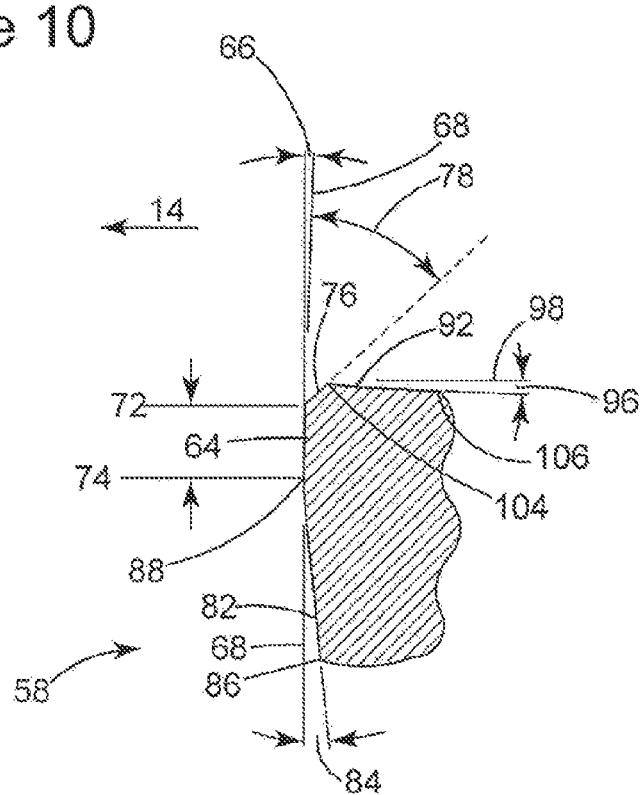
Figure 11:
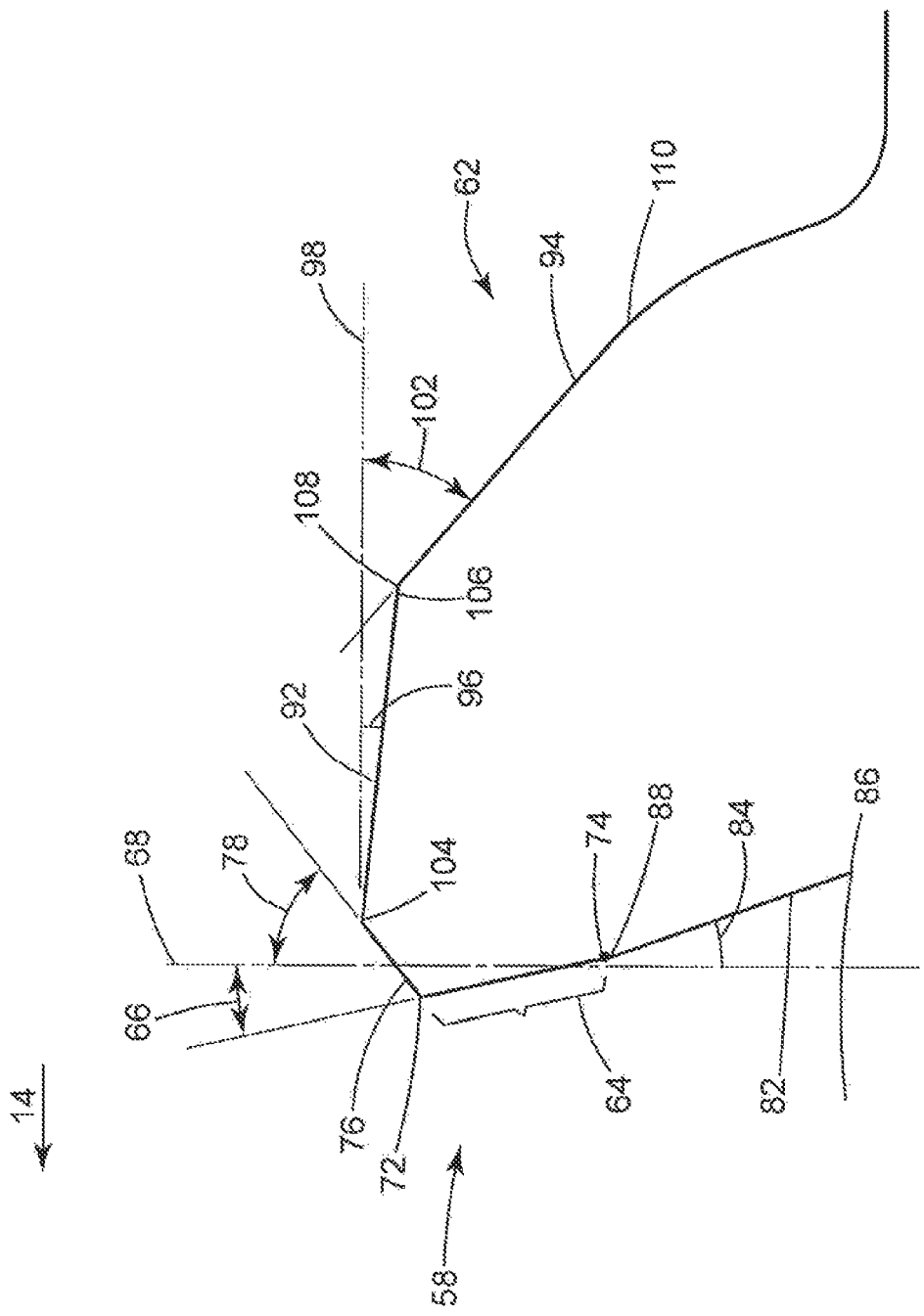
Figure 12:
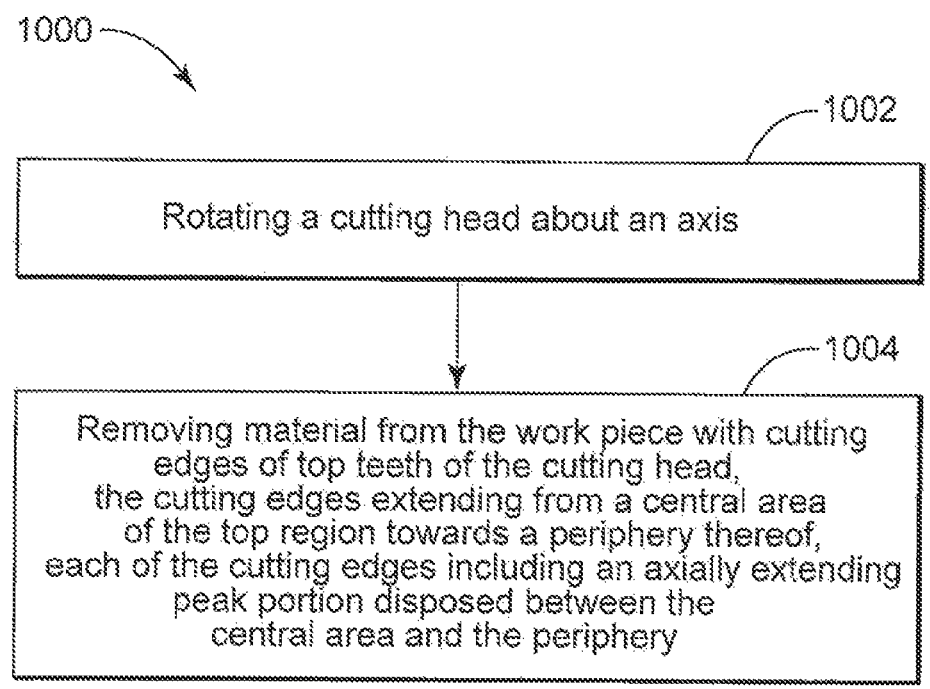
FIG. 12 shows a method according to another exemplary embodiment.

FIGS. 9 to 11 provide various detailed views of a cutting edge 26 of cutting head 10 taken along line A-A of FIG. 8. As may be appreciated in FIGS. 9 to 11, each cutting edge 26 includes a leading face 58 facing a direction of rotation 14 of the cutting head 10 and a trailing face 62. A chamfer face 76 is provided between leading face 58 and trailing face 62. Chamfer face 76 is disposed at an angle 78 relative to a reference plane 68 parallel to the axis of rotation 12 of cutting head 10.

In the embodiment of FIGS. 3 and 8 to 11, leading face 58 includes a flat zone 64 parallel to the cutting edge spoke axis 48. As shown in FIGS. 10 and 11, flat zone 64 may be disposed at an angle 66 relative to the reference plane 68. For example, and as shown in FIGS. 9 to 11, angle 66 is configured such that a flat zone bottom 74 lags a flat zone top 72 in the direction of rotation 14 of cutting head 10.

As further shown in FIGS. 9 to 11, leading face 58 further includes an undercut face 82 below flat zone 64. Undercut face 82 is disposed at an angle 84 relative to reference plane 68 such that a bottom 86 of undercut face 82 lags a top 88 thereof in the direction of rotation 14 of cutting head 10.

In the embodiment of FIGS. 3 and 8 to 11, trailing face 62 includes a first portion 92 disposed at an angle 96 relative to a reference plane 98 perpendicular to the axis of rotation 12 of cutting head 10 and a second portion 94 disposed at an angle 102 relative to reference plane 98. First portion angle 96 is configured such that a front 104 of first portion 92 is disposed at a greater distance from base surface 16 than a rear 106 thereof. Also, second portion angle 102 is configured such that a front 108 of second portion 94 intersects the rear 106 of first portion 92 and is also disposed at a greater distance from base surface 16 than a rear 110 thereof. Further, in the exemplary embodiment shown in FIGS. 3 and 8 to 11, first portion angle 96 is less than second portion angle 102.

As previously described, cutting head 10 can be used to perform a material removal or milling operation on a workpiece. By way of a specific non-limiting example, cutting head 10 can be used to perform a Z-axis plunging operation, by using a motor (not shown) to rotate the cutting head 10 around the Z-axis and by translating the cutting head 10 along the Z-axis, such as during manufacture of an impeller blade of a compressor that can be used to pressurize oil or gas in an oil or a gas pipeline. It is to be understood, however, that cutting head 10 can be used for other material removal, milling, or machining operations, other than on a compressor impeller blade. It is noted that cutting head 10 is configured to remove material not only in front of the mill but also on a side of the mill when advancing along the Z-direction.

Thus, according to an exemplary embodiment, a method 1000 of milling a work piece can include the steps of rotating 1002 a cutting head about an axis and removing 1004 material from the work piece with cutting edges of top teeth of the cutting head, the cutting edges extending from a central area of the top region towards a periphery thereof, each of the cutting edges including an axially extending peak portion disposed between the central area and the periphery.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A cutting head configured to rotate about an axis to remove material from a workpiece, the cutting head comprising:
    a base surface;
    a side region connected to the base surface;
    a top region connected to the side region and defining a central area and a periphery; and
    top teeth disposed on the top region, the top teeth comprising cutting edges configured to contact the workpiece to remove the material, each the cutting edge extending from the central area towards the periphery and comprising an axially extending peak portion,
    wherein the cutting edges-comprise an undercut face below the flat zone, the undercut face being disposed at a non-zero angle relative to the reference plane parallel to the axis of rotation of the cutting head.

2. The cutting head of claim 1, wherein a first portion of each cutting edge extends between the central area and the peak portion and a second portion of each the cutting edge extends between the peak portion and the periphery, the first portion being disposed at a first angle relative to a reference plane perpendicular to the axis and the second portion being disposed at a second angle relative to the reference plane.

3. The cutting head of claim 1, wherein the first portion and the second portion of each the cutting edge intersect at the peak portion and each the peak portion is disposed at a greater distance from the base surface than the first portion and the second portion.

4. The cutting head of claim 1, wherein the cutting edges have a common first angle, the cutting edges have a common second angle, the peak portions define a circle, and the intersection of each the cutting edge with the central area and the intersection of each the cutting edge with the periphery are coplanar, wherein the first angle is greater than the second angle, and wherein each the top tooth defines a spoke axis and the spoke axis forms a non-zero angle relative to a reference radial line extending from the center of the top region, the spoke axis intersecting the reference radial line at the periphery.

5. The cutting head of claim 1, wherein each the cutting edge comprises a leading face facing a direction of rotation of the cutting head and a trailing face, the leading face comprising a flat zone parallel to the spoke axis, wherein the flat zone is disposed at a non-zero angle relative to a reference plane parallel to the axis of rotation of the cutting head, and wherein the flat zone angle is configured such that a bottom of the flat zone lags a top of the flat zone in the direction of rotation of the cutting head.

6. The cutting head of claim 1, wherein each cutting edge comprises a chamfer face between the leading face and the trailing face, the chamfer face being disposed at a non-zero angle relative to the reference plane parallel to the axis of rotation of the cutting head.

7. The cutting head of claim 1, wherein the trailing face comprises a first portion disposed at a non-zero first portion angle relative to a reference plane perpendicular to the axis of rotation of the cutting head and a second portion disposed at a non-zero second portion angle relative to the reference plane, wherein the first portion angle is configured such that a front of the first portion of the trailing face is disposed at a greater distance from the base surface than a rear of the first portion of the trailing face, and wherein the second portion angle is configured such that a front of the second portion intersects the rear of the first portion and is disposed at a greater distance from the base surface than a rear of the second portion.

8. A method of milling a workpiece, the method comprising:
    rotating a mill about an axis; and
    removing material from the workpiece with cutting edges of top teeth of the mill, the cutting edges extending from a central area of the top region towards a periphery of the top region, the cutting edges comprising an axially extending peak portion disposed between the central area and the periphery,
    wherein the cutting edges comprise an undercut face below the flat zone, the undercut face being disposed at a non-zero angle relative to the reference plane parallel to the axis of rotation of the cutting head.

9. A method of milling a workpiece, the method comprising:
    rotating a mill about an axis; and
    removing material from the workpiece with cutting edges of top teeth of the mill, the cutting edges extending from a central area of the top region towards a periphery of the top region, wherein each the cutting edge defines a spoke axis which forms a non-zero angle relative to a reference radial line extending from the center of the top region, the spoke axis intersecting the reference radial line at the periphery,
    wherein the cutting edges-comprise an undercut face below the flat zone, the undercut face being disposed at a non-zero angle relative to the reference plane parallel to the axis of rotation of the cutting head.

10. The method of claim 8, wherein a first portion of each cutting edge extends between the central area and the peak portion and a second portion of each the cutting edge extends between the peak portion and the periphery, the first portion being disposed at a first angle relative to a reference plane perpendicular to the axis and the second portion being disposed at a second angle relative to the reference plane.

11. The method of claim 8, wherein the first portion and the second portion of each the cutting edge intersect at the peak portion and each the peak portion is disposed at a greater distance from the base surface than the first portion and the second portion.

12. The method of claim 8, wherein the cutting edges have a common first angle, the cutting edges have a common second angle, the peak portions define a circle, and the intersection of each the cutting edge with the central area and the intersection of each the cutting edge with the periphery are coplanar, wherein the first angle is greater than the second angle, and wherein each the top tooth defines a spoke axis and the spoke axis forms a non-zero angle relative to a reference radial line-extending from the center of the top region, the spoke axis intersecting the reference radial line at the periphery.

13. The method of claim 8, wherein each the cutting edge comprises a leading face facing a direction of rotation of the cutting head and a trailing face, the leading face comprising a flat zone parallel to the spoke axis, wherein the flat zone is disposed at a non-zero angle relative to a reference plane parallel to the axis of rotation of the cutting head, and wherein the flat zone angle is configured such that a bottom of the flat zone lags a top of the flat zone in the direction of rotation of the cutting head.

14. The method of claim 8, wherein in each cutting edge comprises a chamfer face between the leading face and the trailing face, the chamfer face being disposed at a non-zero angle relative to the reference plane parallel to the axis of rotation of the cutting head.

15. The method of claim 8, wherein the trailing face comprises a first portion disposed at a non-zero first portion angle relative to a reference plane perpendicular to the axis of rotation of the cutting head and a second portion disposed at a non-zero second portion angle relative to the reference plane, wherein the first portion angle is configured such that a front of the first portion of the trailing face is disposed at a greater distance from the base surface than a rear of the first portion of the trailing face, and wherein the second portion angle is configured such that a front of the second portion intersects the rear of the first portion and is disposed at a greater distance from the base surface than a rear of the second portion.

16. The method of claim 9, wherein a first portion of each cutting edge extends between the central area and the peak portion and a second portion of each the cutting edge extends between the peak portion and the periphery, the first portion being disposed at a first angle relative to a reference plane perpendicular to the axis and the second portion being disposed at a second angle relative to the reference plane.

17. The method of claim 9, wherein the first portion and the second portion of each the cutting edge intersect at the peak portion and each the peak portion is disposed at a greater distance from the base surface than the first portion and the second portion.

18. The method of claim 9, wherein the cutting edges have a common first angle, the cutting edges have a common second angle, the peak portions define a circle, and the intersection of each the cutting edge with the central area and the intersection of each the cutting edge with the periphery are coplanar, wherein the first angle is greater than the second angle, and wherein each the top tooth defines a spoke axis and the spoke axis forms a non-zero angle relative to a reference radial line-extending from the center of the top region, the spoke axis intersecting the reference radial line at the periphery.

19. The method of claim 9, wherein each the cutting edge comprises a leading face facing a direction of rotation of the cutting head and a trailing face, the leading face comprising a flat zone parallel to the spoke axis, wherein the flat zone is disposed at a non-zero angle relative to a reference plane parallel to the axis of rotation of the cutting head, and wherein the flat zone angle is configured such that a bottom of the flat zone lags a top of the flat zone in the direction of rotation of the cutting head.

20. The method of claim 9, wherein in each cutting edge comprises a chamfer face between the leading face and the trailing face, the chamfer face being disposed at a non-zero angle relative to the reference plane parallel to the axis of rotation of the cutting head.

\* \* \* \* \*